(12) United States Patent
Mizrachi et al.

(10) Patent No.: US 7,885,845 B2
(45) Date of Patent: Feb. 8, 2011

(54) METHOD AND SYSTEM FOR BIASING SUGGESTED ROOMS AND/OR RESOURCE SEARCH RESULTS BASED ON USER BEHAVIOR RELATED TO RESCHEDULING AND/OR CANCELLING EXISTING RESERVATIONS

(75) Inventors: Boaz Mizrachi, Haifa (IL); Bruce A. Kahn, Hudson, MA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/963,836

(22) Filed: Dec. 23, 2007

(65) Prior Publication Data

US 2009/0164259 A1 Jun. 25, 2009

(51) Int. Cl.
*G06Q 10/00* (2006.01)
(52) U.S. Cl. .............................. 705/8; 705/5
(58) Field of Classification Search .................. 705/5, 705/8
See application file for complete search history.

(56) References Cited

U.S. PATENT DOCUMENTS 5,933,810 A * 8/1999 Okawa ........................ 705/5

| | | | |
|---|---|---|---|
| 2002/0116253 A1* | 8/2002 | Coyne et al. | 705/10 |
| 2002/0138334 A1* | 9/2002 | DeCotiis et al. | 705/10 |
| 2004/0034570 A1* | 2/2004 | Davis | 705/26 |
| 2004/0093259 A1* | 5/2004 | Pych | 705/10 |
| 2005/0065809 A1* | 3/2005 | Henze | 705/1 |
| 2005/0071213 A1* | 3/2005 | Kumhyr et al. | 705/8 |

OTHER PUBLICATIONS

Marsan, Carolyn Duffy, "Calendaring standards gain popularity", Network World, Oct. 28, 2002, v19n45, pp. 29-30.*

* cited by examiner

*Primary Examiner*—John W Hayes
*Assistant Examiner*—Kevin Flynn
(74) *Attorney, Agent, or Firm*—David A. Dagg

(57) ABSTRACT

A system for biasing suggested room and/or resource search results based on user behavior related to rescheduling and/or canceling existing resource reservations. The system uses historical data, statistical analysis, and heuristics to generate suggestions as to which users may be willing and/or able to give up their existing resource reservations for a particular time slot. By monitoring which users reschedule and/or cancel existing reservations, and how often they do so, the system is able to provide a user in need of a previously reserved room/resource with a prioritized list indicating which other users with existing resource reservations during the desired time slot are relatively more likely to cancel their reservations, and/or to transfer their reservations to the scheduling user.

12 Claims, 2 Drawing Sheets

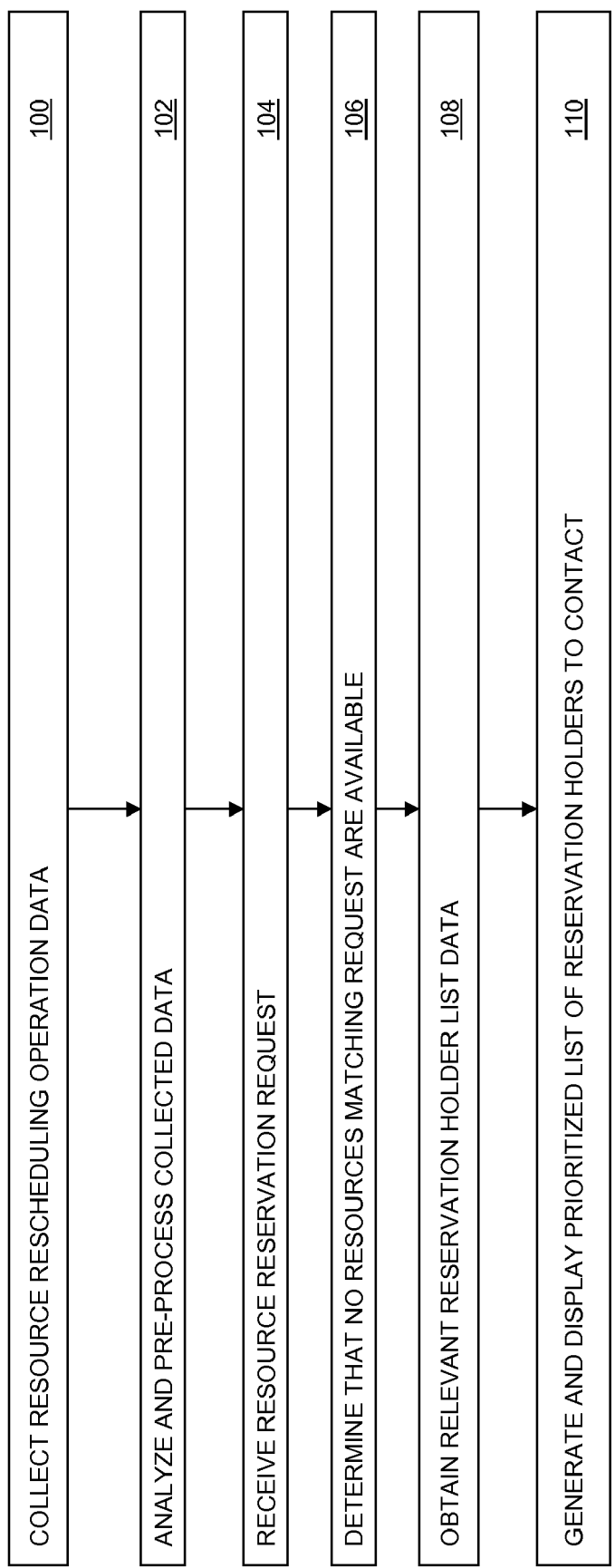

METHOD AND SYSTEM FOR BIASING SUGGESTED ROOMS AND/OR RESOURCE SEARCH RESULTS BASED ON USER BEHAVIOR RELATED TO RESCHEDULING AND/OR CANCELLING EXISTING RESERVATIONS

FIELD OF THE INVENTION

The disclosed system relates generally to electronic calendaring, and more specifically to a method and system for biasing suggested rooms and/or resource search results based on user behavior related to rescheduling and/or canceling existing reservations.

BACKGROUND OF THE INVENTION

As it is generally known, resource scheduling tools, such as electronic calendaring systems, are widely used in corporate environments to schedule meetings with colleagues. Existing systems are capable of automatically checking the electronic calendars of team members for open time slots, proposing alternative meeting times, scheduling meeting resources, and notifying/reminding participants of meetings by electronic mail ("e-mail").

A shortcoming of existing systems arises when there is competition for a fixed set of meeting resources, such as conference rooms, presentation equipment, and/or other shared meeting resources. In such circumstances, users will sometimes make accommodations to other users based on the other users' needs. For example, a user may need to reserve a conference room for a meeting for a specific time on a specific day (e.g. due to participant scheduling constraints), and in a specific facility having only three conference rooms: Room A, Room B, and Room C. When the user checks the availabilities of Room A, Room B, and Room C, he or she sees that each room has already been reserved for the specific day and time that is required for the meeting. Accordingly, in order to reserve one of the rooms, the currently scheduling user must contact each of the other users that have previously reserved conference rooms in order to find out if they would be willing to give up their reservation to accommodate the scheduling user's needs. If the currently scheduling user finds out that one of the previously reserving users no longer needs their reservation, or if one of the previously reserving users is willing and able to reschedule their meeting, then the reserved room can be freed up so that the currently scheduling user can reserve it for the new meeting at the necessary date and time.

As the pool of users sharing meeting resources grows, the competition for resources increases, thus making it more difficult to accommodate the needs of all users, and the quantity of personal negotiations for resources must increase. In many situations, it is the same users who will either cancel or reschedule their reservations at the request of other users. This flexible behavior on the part of some users may not be easily noticed by other users based upon the few personal interactions they typically have with such users, especially if not all interactions result in the freeing up of a reserved room or resource.

In existing systems, use patterns indicating which user might be the most accommodating individual with regard to rescheduling or giving up their existing resource reservations go unobserved and unutilized. As a result, users must randomly query users with resource reservations until they find someone who will accommodate them, or until they exhaust all available options. This lengthy process can be time consuming and tedious, without necessarily yielding any helpful results. It would therefore be desirable to have a new system that effectively addresses this waste of time and energy on the part of resource scheduling users in situations where there is significant competition for schedulable resources.

SUMMARY OF THE INVENTION

To address the above described and other shortcomings of previous techniques, a new method and system are disclosed for biasing suggested room and/or resource search results based on user behavior related to rescheduling and/or canceling existing resource reservations. The disclosed system uses historical data, statistical analysis, and/or heuristics to generate suggestions as to which users may be willing and/or able to give up their existing resource reservations for a particular time slot. By monitoring which users reschedule and/or cancel existing reservations, and/or how often they do so, the disclosed system is able to provide a user in need of a previously reserved room/resource with a prioritized list indicating which other users with existing resource reservations during the desired time slot are relatively more likely to cancel their reservations, and/or to transfer their reservations to the scheduling user.

During operation, the disclosed system monitors actions performed by users that have created reservations for meeting rooms and/or other schedulable resources. A user behavior tracking process tracks and tallies user operations related to cancellation and/or transfer of previously created resource reservations, such as how often a user transfers a reservation to other users, and/or how often a user reschedules a reservation prior to the time slot of the rescheduled reservation being re-reserved by another user. In one embodiment, a time interval between rescheduling of a resource reservation and re-reservation of the rescheduled resource at the original time slot is measured. If the time period is sufficiently short, the disclosed system infers that the originally reserving user gave up the reservation at the behest of the user reserving the resource subsequent to rescheduling of the original reservation. Otherwise, if the time period is not sufficiently short, then the disclosed system determines that the originally reserving user gave up the reservation because they no longer needed it. These determinations are then used to prioritize suggestions made to a scheduling user indicating which other users are relatively more likely to be willing to reschedule their existing resource reservations during a desired time slot, or to not need such existing resource reservations.

In another aspect of the disclosed system, resource-specific weighting is applied to the collected user behavior information when generating the prioritized suggestions. The per-resource weighting allows the disclosed system to determine when users have different levels of responsiveness for different resources, e.g. when a user is relatively highly responsive to rescheduling requests for some previously reserved resources, but relatively less responsive for others. Such resource specific differences in a user's actions may, for example, arise because a certain conference room is a user's favorite conference room, or because a certain conference room is reserved by a user because it meets the user's particular requirements.

In another aspect of the disclosed system, requests to release reserved resources are also monitored, in order to assist in determining whether a rescheduling user is changing an existing resource reservation in response to another user's request, or independently for their own benefit.

In another aspect of the disclosed system, requester-specific weighting is applied to the user tracking information when generating prioritized suggestions. To support per-requester weighting, the disclosed system monitors the identities of requesting users to determine whether requests from certain users are likely to cause a specific user to give up a previously reserved resource. Accordingly, if a first user relatively frequently gives up resource reservations in response to requests from a second user, but relatively rarely gives up resource reservations in response to requests from a third user, then the first user would be relatively highly placed within a list indicating potentially responsive users displayed to the second user, but placed relatively lower within a list of potentially responsive users displayed to the third user.

The collected user behavior information is analyzed and processed so that it can be used when a user needs to schedule a resource at a particular time. If a resource is not available at a desired time, the collected data is queried to support generation of a user interface display object including a prioritized list displaying users having resource reservations at the desired time. The prioritized list may display resources fitting the resource request parameters, but ordered based on the collected user behavior data and the identities of the users currently having reserved each resource in the list. The ordered list enables the scheduling user to conveniently identify and contact reservation holders that are relatively more likely to respond by rescheduling or canceling their existing reservations.

Thus there is disclosed a new method and system for biasing suggested rooms and resource search results based on user behavior related to canceling and/or rescheduling existing resource reservations. The system observes and utilizes user behavior patterns indicating which user(s) are likely to be the most accommodating with regard to changing or giving up existing resource reservations in response to another user's request. The disclosed system enables a scheduling user to intelligently select which other users having existing resource reservations to contact when they need to reserve a previously reserved resource.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a flow chart showing steps performed during operation of an illustrative embodiment.

DETAILED DESCRIPTION OF EXEMPLARY EMBODIMENTS

Figure 1:
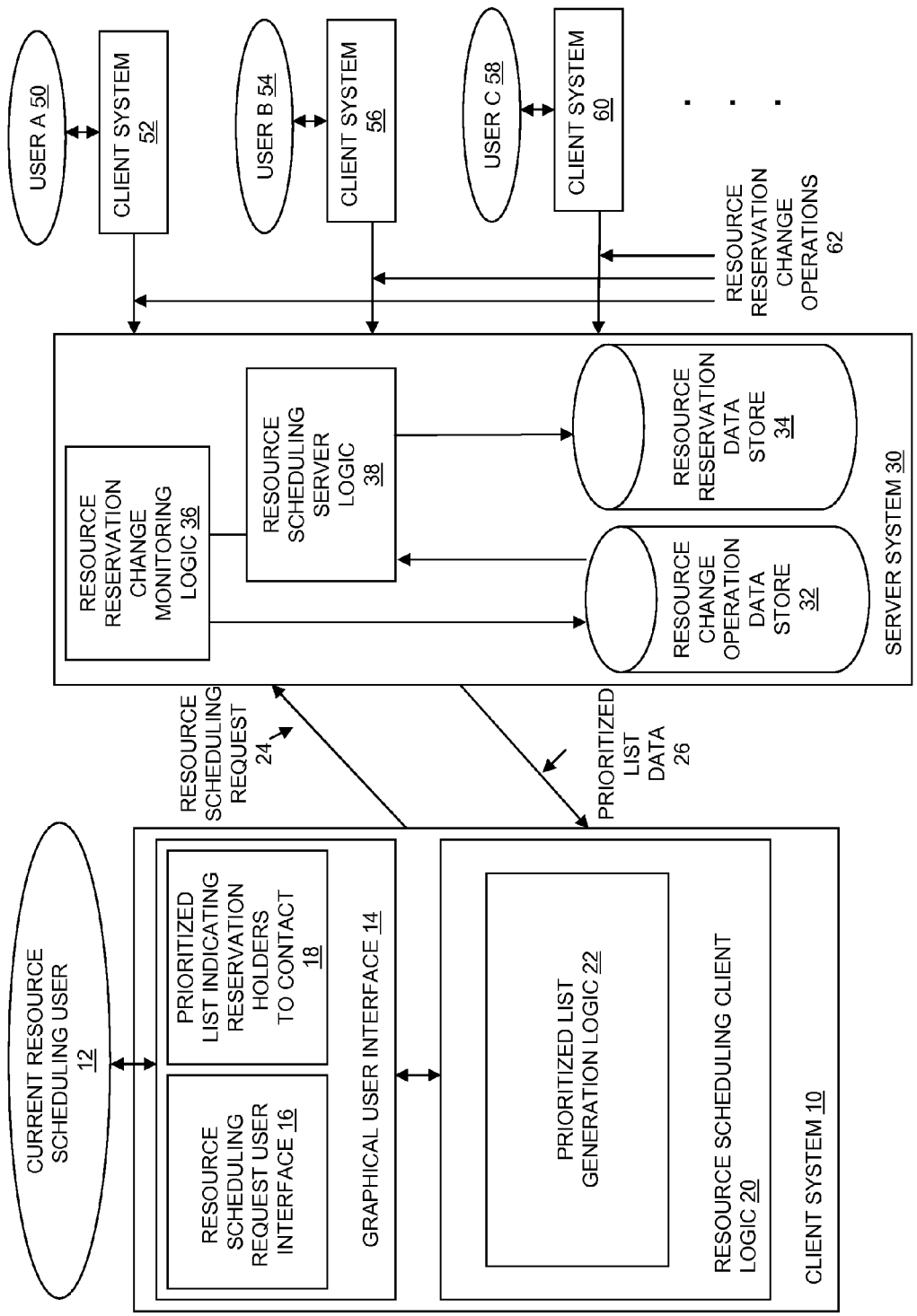
FIG. 1 is a block diagram showing hardware and software components in an illustrative embodiment.

FIG. 1 is a block diagram showing hardware and software components in an illustrative embodiment. As shown in FIG. 1, a Client System 10 includes a Graphical User Interface 14 generated by a Resource Scheduling Client Logic 20 to a Current Resource Scheduling User 12. The Graphical User Interface 14 includes a Resource Scheduling Request User Interface 16 and a Prioritized List Indicating Reservation Holders to Contact 18. The Resource Scheduling Client Logic 20 includes a Prioritized List Generation Logic 22. In the illustrative embodiment of FIG. 1, the Resource Scheduling Client Logic 20 is at least a part of a system for reserving meeting resources such as conference rooms, conferencing equipment, etc., that are shared by multiple users, such as an electronic calendaring system or the like. Moreover, those skilled in the art will recognize that the disclosed system is not limited to conference room and/or equipment reservation systems, but may be applied more generally to systems for reserving any specific type of shared resource.

Further with reference to the illustrative embodiment of FIG. 1, a Server System 30 is shown including a Resource Change Operation Data Store 32 and a Resource Reservation Data Store 34, as well as Resource Reservation Change Monitoring Logic 36, and Resource Scheduling Server Logic 38. A number of other client systems and their respective users are also shown in FIG. 1, including a Client System 52 associated with User A 50, a Client System 56 associated with a User B 54, a Client System 60 associated with a User C 58, etc. The Resource Scheduling Server Logic 38 is, for example, a server portion of the resource reservation system that Resource Scheduling Client Logic 20 is a client portion of.

During operation of the illustrative embodiment of FIG. 1, various users reserve resources through the resource reservation system, for example using resource scheduling client logic on their respective client systems, and within the Resource Scheduling Server Logic 38. The resource reservation data describing the specific resources reserved, including, for example, the times of the reservations and the specific users that made each reservation, is stored by the Resource Scheduling Server Logic 38 in the Resource Reservation Data Store 34. After such resource reservations are made, the disclosed system detects when reservations are changed by the reservation holders, as illustrated in FIG. 1 Resource Reservation Change Operations 62. The Resource Reservation Change Operations 62 include operations that cancel, transfer and/or reschedule previously made resource reservations. In the illustrative embodiment of FIG. 1, the Resource Reservation Change Monitoring Logic 36 detects and collects the Resource Reservation Change Operations 62, and stores information contained in each of the Resource Reservation Change Operations 62, such as the identity of the user making the reservation change, the resource that the changed reservation was for, the type of change operation (cancel, transfer, reschedule, etc.), the user to which a resource reservation is being transferred in the case of a reservation transfer, the time of the reservation change operation, the identity of any user that may have issued a request to the reservation holder that resulted in the reservation change, the time of the original resource reservation, the time to which the reservation is rescheduled, and/or any other specific information regarding Resource Reservation Change Operations 62 that may be relevant to a given embodiment and/or implementation of the disclosed system.

In order to collect the information stored in the Resource Change Operation Data Store 32, the Resource Reservation Change Monitoring Logic 36 interfaces to and/or is integrated into the resource reservation system (e.g. electronic calendaring system) shown in FIG. 1 by the Resource Scheduling Server Logic 38, Resource Scheduling Client Logic 20 and Resource Reservation Data Store 34. The Resource Reservation Change Monitoring Logic 36 may similarly be interfaced to and/or integrated into one or more other applications through which users communicate messages and/or information regarding resource reservations, such as electronic mail, instant messaging, on-line video conferencing systems, etc.

Further during operation of the illustrative embodiment shown in FIG. 1, the Resource Reservation Change Monitoring Logic 36 may perform statistical analysis and/or pre-processing of the data stored in the Resource Change Operation Data Store 32. Such analysis or pre-processing may, for example, include calculating and/or otherwise determining statistical data regarding specific users' behavior, such as the frequency with which they change any reservations they have made, the frequency with which they change reservations for specific resources, the frequency with which they change resource reservations as the result of being sent resource reservation change requests from all other users, the frequency with which they change resource reservations as the result of being sent resource change requests from specific other users, the frequency with which they change resource reservations for specific times of day and/or days of the week, and/or any other specific statistical information that can be derived from the contents of the Resource Reservation Change Operations 62 and/or the contents of the Resource Reservation Data Store 34. As described further below, the contents of the Resource Reservation Change Operations 62, including the results of such analysis and/or pre-processing, is used to provide Prioritized List Data 26 to the Client System 10 for use in generating the Prioritized List Indicating Reservation Holders To Contact 18.

In one embodiment of the disclosed system, when the Resource Reservation Change Monitoring Logic 36 detects that a first user has in some way released a resource reservation (e.g. rescheduled and/or canceled the reservation), the Resource Reservation Change Monitoring Logic 36 starts a timer to measure the time period from when the resource is released until the resource is reserved by a second user for the same time slot as the released reservation. This time period is then compared with a pre-determined threshold. If the time period is less than the predetermined threshold, then the Resource Reservation Change Monitoring Logic 36 logically infers that the resource cancellation or rescheduling operation by the first user was performed at the request of the second user. As a result, the Resource Reservation Change Monitoring Logic 36 stores an indication in the Resource Change Operation Data Store 32 that the resource reservation change operation by the first user was made at the request of the second user. Similarly, when a transfer of a resource reservation is made from a first user to a second user, the Resource Reservation Change Monitoring Logic 36 stores an indication in the Resource Change Operation Data Store 32 that the reservation change operation by the first user was made at the request of the second user.

The pre-determined threshold compared to the time period from when a resource is released until the resource is reserved by a second user for the same time slot as the released reservation may, for example, be a user adjustable value, so that a system administrator user or the like can 'tune' the system based on use factors such as the level of user activity, etc. Accordingly, the threshold may be a dynamically settable value within a range of, for example, between zero (0) seconds and some number of minutes (e.g. 15 minutes).

The dynamically adjustable threshold of this embodiment of the disclosed system advantageously allows for adjustments reflecting the level of user activity, e.g. an adjustment to a relatively shorter value would be appropriate in a use context in which there is a relatively high rate of resource reservation activities. In such a relatively busy use context, a longer threshold value would provide less useful inferences regarding whether a re-scheduled resource was released at the behest of the rescheduling user. Conversely, in a use context involving relatively fewer active users, the threshold could advantageously be adjusted to a relatively longer value, in order to allow for an increased amount of user behavior inferences, since a relatively short value in such a use context could severely limit the per-user biasing weights. The adjustable threshold allows values to be selected by a system administrator to match the characteristics of a particular installation.

The disclosed system may further be embodied to directly monitor request messages made between users asking for the release of previously reserved resources. In such an embodiment, the disclosed system determines whether resources are subsequently released (e.g. within a pre-determined time period) by reservation holders following receipt of a request message sent to such reservation holders. Indications of whether resources are released as a result of request messages may accordingly be maintained in the Resource Change Operation Data Store 32 on a per request-recipient, per request-sender, per resource, and/or per resource reservation time-slot basis, and/or in association with or correlation to any other specific request and/or resource characteristic(s).

As further illustrated in FIG. 1, a Resource Scheduling Request 24 is sent from the Client System 10 to the Server System 30. For example, the Current Resource Scheduling User 12 may be attempting to schedule a meeting for a number of invitees. Accordingly, the Current Resource Scheduling User 12 uses the Resource Scheduling Request User Interface 16 to enter a number of resource reservation request parameters, such as a desired meeting start time and/or time period during which Current Resource Scheduling User 12 wishes to schedule the meeting, an indication of which meeting rooms or the like that Current Resource Scheduling User 12 would like to reserve for the meeting (e.g. an indication of a facility in which the meeting must be held. and/or indications of one or more specifically identified conference rooms), and/or one or more meeting room characteristics that must be met (e.g. minimum room size in terms of attendees, equipment requirements such as video conferencing support, etc.). The request parameters entered by Current Resource Scheduling User 12 are included by the Resource Scheduling Client Logic 20 into the Resource Scheduling Request 24. When the Server System 30 receives Resource Scheduling Request 24, the Resource Scheduling Server Logic 38 checks the Resource Reservation Data Store 34 to determine if there are any available resources that meet the requirements set forth in the request parameters of the Resource Scheduling Request 24. If an available resource is found, then an indication of the available resource is sent back to the Client System 10 and displayed to Current Resource Scheduling User 12. If no available resource is found matching the request parameters, then the Resource Scheduling Server Logic 38 generates Prioritized List Data 26 based on the contents of the Resource Change Operation Data Store 32, and sends Prioritized List Data 26 to the Client System 10. The Prioritized List Data 26 includes indications of user behaviors from the Resource Change Operation Data Store 32 from which can be formed a prioritized list visually displaying which users currently having reservations for resources matching the request parameters are most likely to respond to a resource request from the Current Resource Scheduling User 12 by releasing their respective resource reservations.

The Resource Scheduling Client Logic 20 uses Prioritized List Data 26 to generate the Prioritized List Indicating Reservation Holders To Contact 18. The Prioritized List Indicating Reservation Holders to Contact 18 is ordered such that the entries closest to the top of the list indicate other users that have reservations of resources that match the request parameters in Resource Scheduling Request 24, and that are most likely to respond favorably to a request from Current Resource Scheduling User 12 to release their resource reservations, so that Current Resource Scheduling User 12 can schedule the desired meeting. As shown in FIG. 1, the entries in the Prioritized List Indicating Reservation Holders to Contact 18 are ordered based on the Prioritized List Data 26, which is in turn generated based on indications of previous behaviors of (i.e. actions performed by) users holding reservations for resources matching the request parameters in the Resource Scheduling Request 24, as stored in the Resource Change Operation Data Store 32.

The Prioritized List Indicating Reservation Holders to Contact 18 may, for example, be a list of entries, list elements, etc., each of which contains/displays a name of a resource matching the request parameters, and further including a name and contact information for the respective user currently having reserved the resource in a time slot matching request parameters indicated in the Resource Scheduling Request 24.

The Prioritized List Indicating Reservation Holders to Contact 18 may reflect various "weightings" applied to the data stored in the Resource Change Operation Data Store 32 and/or to the Prioritized List Data 26. Such weightings cause the disclosed system to prioritize the entries in the Prioritized List Indicating Reservation Holders to Contact 18 based on one or more weighted factors. For example, resource-specific weighting may be applied to the collected user behavior information stored in the Resource Change Operation Data Store 32, when generating the Prioritized List Data 26. Such per-resource weighting enables the disclosed system to order the Prioritized List Indicating Reservation Holders to Contact 18 such that reservation holders whose previous behavior indicates that they are relatively more likely to accommodate requests to release reservations for the specific resources they have reservations for and that match the parameters of the Resource Scheduling Request 24 are listed relatively closer to the top of the list than other reservation holders. Similarly, the disclosed system may operate such that requester-specific weighting is applied to the collected user behavior information stored in the Resource Change Operation Data Store 32, when generating the prioritized suggestions. Such per-requester weighting enables the disclosed system to order the Prioritized List Indicating Reservation Holders to Contact 18 such that reservation holders whose previous behavior indicates that they are relatively more likely to accommodate requests to release reservations from the Current Resource Scheduling User 18 are listed relatively closer to the top of the list than other reservation holders. Multiple factors may be weighted in combination when generating the Prioritized List Indicating Reservation Holders to Contact 18, and various other specific weightings (e.g. per-reservation time, etc.) may be individually applied instead of, or in addition to, one or both of the per-resource and/or per-requester weightings described above.

The Client Systems 10, and 52, 56, 60, etc. of FIG. 1 may each be any specific type of a computer systems and/or intelligent electronic devices, such as desktop, laptop, or palmtop computer systems, and/or personal digital assistant, cell phone, or other electronic devices. The Client Systems 10 and 52, 56, 60, etc. each include or control display devices capable of displaying a graphical user interface (e.g. including Graphical User Interface 14) to a local user (e.g. users 12 and 50, 54, 58, etc.), such as a liquid crystal display (LCD), cathode ray tube (CRT), interferometric modulator display (IMOD), light emitting diode (LED), or the like.

Those skilled in the art will further recognize that the Resource Scheduling Client Logic 20, Resource Reservation Change Monitoring Logic 36, and/or Resource Scheduling Server Logic 38 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 10 and 52, 56, 60, etc., and Server System 30 of FIG. 1 may each include one or more processors, and program storage, such as memory, for storing program code executable on such processors, as well as input/output devices and/or interfaces. In the example of FIG. 1, the Client Systems 10 and 52, 56, 60, etc., and Server System 30 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration a limited number of client systems and respective users are shown in FIG. 1, the disclosed system is not limited to any specific number of users and/or client systems. Moreover, while certain functions are described as being performed in the Client Systems 10 and 52, 56, 60, etc., and in the Server System 30, the disclosed system is not limited to any specific configuration or implementation in that regard. Accordingly, operations described as occurring in the Client Systems 10 and 52, 56, 60, etc. may alternatively be performed in the Server System 30, and vice versa. In addition, while the illustrative embodiment of FIG. 1 is implemented in a client-server architecture, the disclosed system is not limited to such an embodiment, and may alternatively be embodied using any other specific type of system architecture that may be appropriate and or advantageous for a given implementation.

FIG. 2 is a flow chart showing steps performed during operation of an illustrative embodiment. At step 100, the disclosed system collects resource rescheduling operation data (e.g. Resource Reservation Change Operations 62 in FIG. 1). At step 102, the disclosed system analyzes and pre-processes the data collected in step 100. The disclosed system receives a resource reservation request at step 104 (e.g. Resource Scheduling Request 24 of FIG. 1), and at step 106 determines that no resources are available matching the parameters of the request (e.g. based on the contents of Resource Reservation Data Store 34 of FIG. 1). In response to the determination made at step 106, at step 108 the disclosed system obtains information describing holders of reservations for resources matching the parameters of the resource reservation request (e.g. from the Resource Change Operation Data Store 32 in FIG. 1). At step 110, the disclosed system generates and displays a prioritized list of entries (e.g. Prioritized List Indicating Reservation Holders to Contact 18 in FIG. 1), where each entry displays contact information (e.g. user name, e-mail address, phone number, cell phone number, instant messaging screen name, etc.) for one of the resource reservation holders described by the information obtained in step 108. The entries in the prioritized list generated at step 110 are ordered such that the top-most entries display contact information for resource reservation holders that are most likely to respond to requests to release their respective resource reservations by releasing their respective resource reservations. As also described above, the specific ordering of the entries in the prioritized list generated at step 110 may be based on a factor weighting applied to the previously collected user behavior data, causing the entries in the list to be ordered based on one or more previously monitored user behaviors, such as the frequencies at which current reservation holders have previously released reservations for the currently desired resource (i.e. entries being listed topmost for those reservation holders most frequently having previously released reservations for the currently desired resource), the frequencies at which current reservation holders have previously released reservations to the current scheduling user (i.e. entries being listed topmost for those reservation holders most frequently having previously released reservations to the current scheduling user), the frequencies at which current reservation holders have previously released reservations for the currently desired time (i.e. entries being listed topmost for those reservation holders most frequently having previously released reservations for the currently desired time), etc.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method for responding to a request for a schedulable resource, comprising:
    measuring a time interval between rescheduling of an original reservation of a resource at a given time slot and a subsequent new reservation of the resource at the same given time slot;
    comparing said time interval to a threshold minimum time;
    in response to said time interval being less than said threshold minimum time, determining that said resource reservation was given up at the behest of a user making said subsequent new reservation;
    determining that users that give up resource reservations at the behest of other users relatively more frequently are more likely to accommodate a request that they change their existing resource reservations than users that give up resource reservations at the behest of other users relatively less frequently;
    generating, by a computer, a list in response to said request for said schedulable resource, said list made up of list entries, wherein each list entry includes a user identifier of a user having an existing reservation of a resource matching parameters of said request for said schedulable resource, and wherein said entries in said list are ordered by user identifier based on said collected user behavior data related to said resource reservation changes, wherein entries relatively nearer to a top of said list include user identifiers of users that are relatively more likely to accommodate a request that they change their existing resource reservations; and
    displaying said list in a graphical user interface.

2. The method of claim 1, further comprising:
    monitoring when users transfer resource reservations to other users; and
    wherein users that transfer resource reservations to other users relatively more frequently are determined to be more likely to accommodate a request that they change their existing resource reservations than users that transfer their resource reservations to other users relatively less frequently.

3. The method of claim 2, further comprising:
    monitoring when users reschedule resource reservations; and
    wherein users that reschedule resource reservations relatively more frequently are determined to be more likely to accommodate a request that they change their existing resource reservations than users that reschedule resource reservations relatively less frequently.

4. The method of claim 3, further comprising:
    monitoring when users cancel resource reservations; and
    wherein users that cancel resource reservations relatively more frequently are determined to be more likely to accommodate a request that they change their existing resource reservations than users that cancel resource reservations relatively less frequently.

5. The method of claim 4, further comprising:
    monitoring which resources are subject to changes in user resource reservations; and
    wherein users that more frequently change their resource reservations for said resources matching said parameters of said request for said schedulable resource relatively more frequently are determined to be more likely to accommodate a request that they change their existing resource reservations than users that change their resource reservations for said resources matching said parameters of said request for said schedulable resource relatively less frequently.

6. The method of claim 5, further comprising:
    monitoring the identities of users making resource reservation change requests to other users; and
    wherein users that more frequently change resource reservation changes in response to resource reservation change requests from a current resource scheduling user that issued said request for said schedulable resource relatively more frequently are determined to be more likely to accommodate a request that they change their existing resource reservations than users that make change resource reservation changes in response to resource reservation change requests from said current resource scheduling user issuing said request for said schedulable resource relatively less frequently.

7. The method of claim 6, wherein said parameters of said request for said schedulable resource include a target time period limitation.

8. The method of claim 7, wherein said parameters of said request for said schedulable resource include a minimum room size limitation.

9. The method of claim 8, wherein said parameters of said request for said schedulable resource include a location limitation.

10. The method of claim 9, wherein said schedulable resource comprises a conference room.

11. A computer system including at least one processor and at least one computer readable memory having program code stored thereon, said program code operable when executed by said at least one processor to cause said computer system to respond to a request for a schedulable resource by performing the steps of:

measuring a time interval between rescheduling of an original reservation of a resource at a given time slot and a subsequent new reservation of the resource at the same given time slot;

comparing said time interval to a threshold minimum time;

in response to said time interval being less than said threshold minimum time, determining that said resource reservation was given up at the behest of a user making said subsequent new reservation;

determining that users that give up resource reservations at the behest of other users relatively more frequently are more likely to accommodate a request that they change their existing resource reservations than users that give up resource reservations at the behest of other users relatively less frequently;

generating a list in response to said request for said schedulable resource, said list made up of list entries, wherein each list entry includes a user identifier of a user having an existing reservation of a resource matching parameters of said request for said schedulable resource, and wherein said entries in said list are ordered by user identifier based on said collected user behavior data related to said resource reservation changes, wherein entries relatively nearer to a top of said list include user identifiers of users that are relatively more likely to accommodate a request that they change their existing resource reservations; and displaying said list in a graphical user interface of said computer system.

12. A computer program product comprising:

a non-transitory computer readable medium, said non-transitory computer readable medium having program code stored thereon for responding to a request for a schedulable resource, said program code comprising program code for measuring a time interval between rescheduling of an original reservation of a resource at a given time slot and a subsequent new reservation of the resource at the same given time slot, program code for comparing said time interval to a threshold minimum time, program code for, in response to said time interval being less than said threshold minimum time, determining that said resource reservation was given up at the behest of a user making said subsequent new reservation, program code for determining that users that give up resource reservations at the behest of other users relatively more frequently are more likely to accommodate a request that they change their existing resource reservations than users that give up resource reservations at the behest of other users relatively less frequently, program code for generating a list in response to said request for said schedulable resource, said list made up of list entries, wherein each list entry includes a user identifier of a user having an existing reservation of a resource matching parameters of said request for said schedulable resource, and wherein said entries in said list are ordered by user identifier based on said collected user behavior data related to said resource reservation changes, wherein entries relatively nearer to a top of said list include user identifiers of users that are relatively more likely to accommodate a request that they change their existing resource reservations, and program code for displaying said list in a graphical user interface of a computer system.

\* \* \* \* \*